July 14, 1970 E. H. BLACKWELL 3,520,278
TURNTABLE APPARATUS FOR DUST AND FUME REMOVAL FROM A WORKPIECE
Filed Jan. 15, 1968
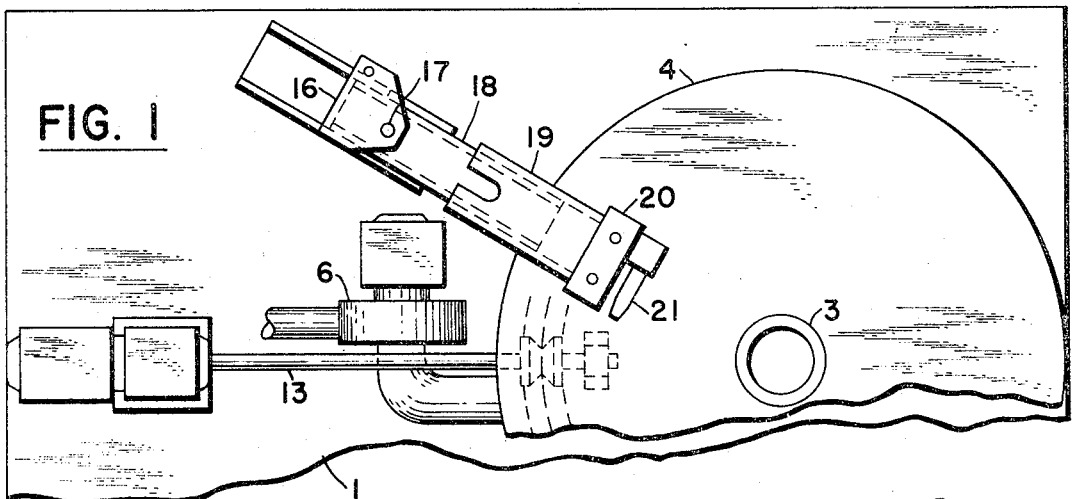
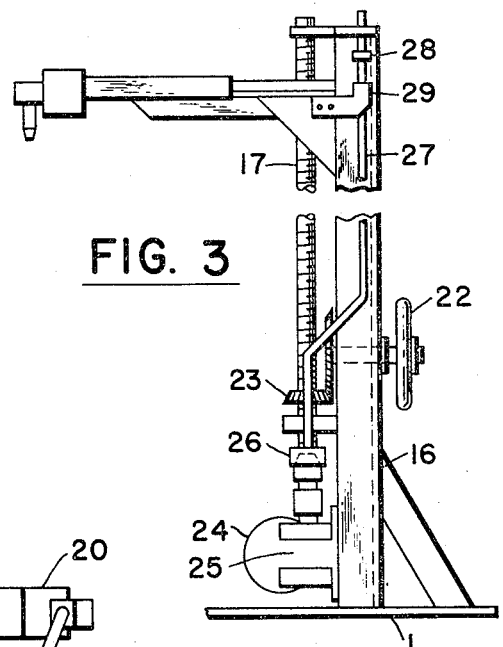
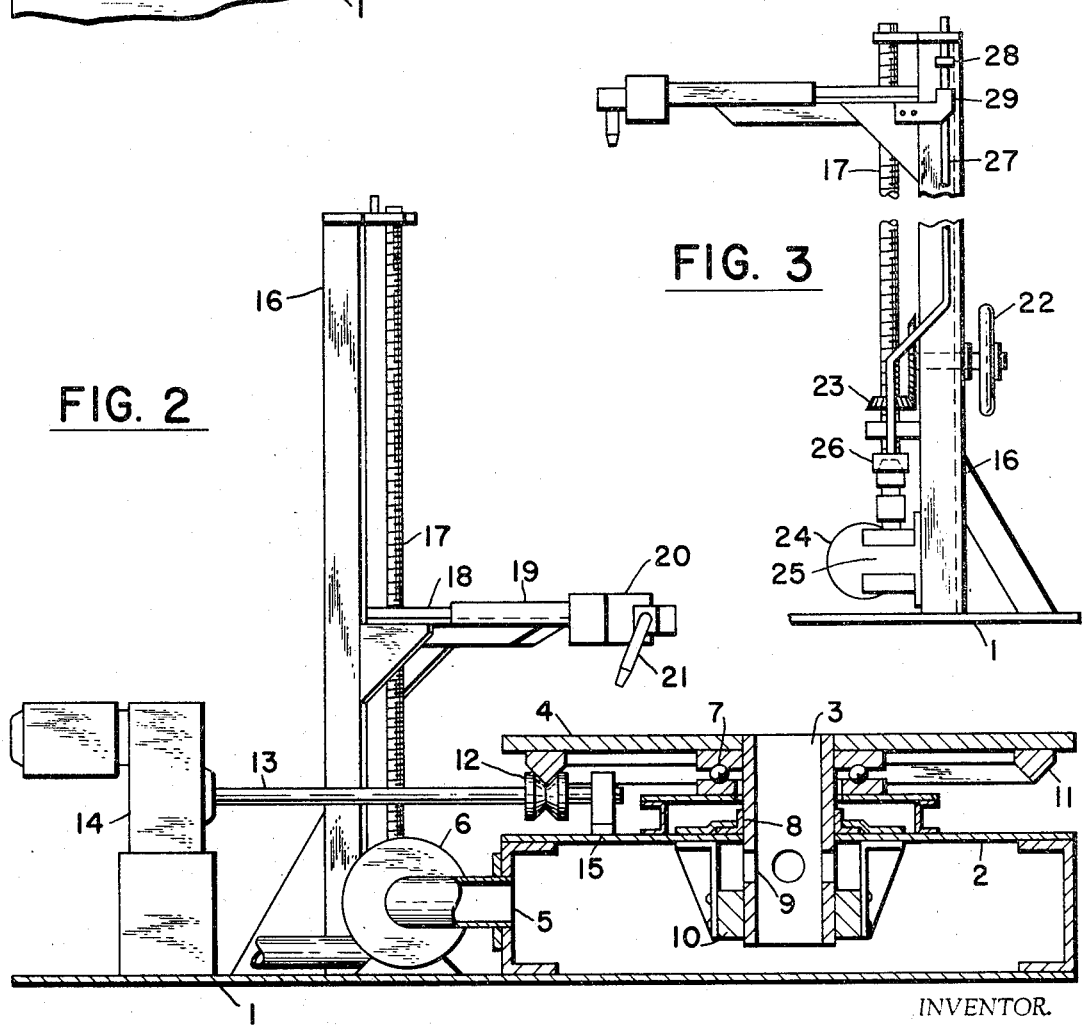
INVENTOR.
ELLIOTT H. BLACKWELL
BY
*Elliott S. Blodgett*
ATTORNEY United States Patent Office 3,520,278
Patented July 14, 1970

3,520,278
TURNTABLE APPARATUS FOR DUST AND FUME
REMOVAL FROM A WORKPIECE
Elliott H. Blackwell, Warren, Mass., assignor to Warren Pumps, Inc., Warren, Mass., a corporation of Massachusetts
Filed Jan. 15, 1968, Ser. No. 698,010
Int. Cl. B05c 5/00
U.S. Cl. 118—47                5 Claims

ABSTRACT OF THE DISCLOSURE

A turntable mechanism for removing airborne by-products that are produced during treatment of a workpiece that is positioned on the turntable, the mechanism comprising:
(a) a centrally apertured turntable with a downwardly extending hollow spindle;
(b) an antifriction bearing for supporting the weight of the turntable, spindle and workpiece and a bearing ring engaging the lower end of the spindle to give it lateral support;
(c) means for rotating the turntable; and
(d) means for adjustably and movably supporting a work-treating device above the turntable.

BACKGROUND OF THE INVENTION

The broad field of the invention is rotating work tables and particularly coating by projection onto a rotating base.

In the methods of treatment and application of coatings to workpieces it is known in the prior art to rotate the workpiece in order to make a uniform application. Such prior art methods are disclosed in U.S. Pat. 2,845,366 of Schroeder and U.S. Pat. 2,966,423 of Schichman. The Schroeder patent discloses the application of an aluminum coating to the inside of a horizontally rotated pipe by a horizontally adjustable nozzle. The patent of Schichman discloses the flame spraying of metal coatings onto a workpiece that is rotated in the vertical plane.

The Schroeder and Schichman references are representative of the prior art where no provision is made for the removal of dust and fumes resulting from the treatment of the workpiece.

SUMMARY OF THE INVENTION

It is therefore an object of the present invention to provide a turntable mechanism having means for removing dust and fumes produced during the treatment of a workpiece.

Still another object of the invention is the application of uniform coatings to base materials.

A particular object of the present invention is an apparatus for applying flame sprayed metal coatings to the inside and outside diameters of cylindrical base materials.

Upon further study of the specification and claims other objects and advantages of the present invention will become apparent.

According to a particular embodiment of the invention, an apparatus for applying flame sprayed metal coatings is provided having a turntable with a hole in the center thereof for removing and collecting the by-products of the spraying operation, a drive for rotating the turntable, a traveling head mounted on a vertical column having a motor or hand operated lead screw for raising and lowering the head, and a metal spray gun and coating material mounted on the traveling head for flame spraying the outside and inside diameters of cylindrical objects positioned on the turntable.

To further facilitate the removal of dust and fumes resulting from the flame spraying operation the turntable is mounted on a suction box and the suction box is connected to a suction pump for withdrawing dust and fumes through the hole in the turntable.

BRIEF DESCRIPTION OF THE DRAWING

A better understanding of the invention may be had by reference to the annexed drawing wherein:
FIG. 1 is a plan view of the apparatus;
FIG. 2 is a side view thereof in vertical cross section; and
FIG. 3 is a detailed showing of FIG. 2 illustrating the means for raising and lowering the treating device.

With particular reference to FIG. 2, the apparatus is shown mounted on a bed plate 1 to which an airtight suction box 2 is secured, the top of which has a large opening for receiving the hollow spindle 3 of the turntable 4 while one side of it has an air outlet connected to a conduit 5 leading to the inlet opening of a suction blower 6.

The turntable 4 is supported on a large roller bearing 7 secured in horizontal position on top of the suction box 2 while the spindle 3 is kept in rotatable contact with a sealing ring 8. The portion of the hollow spindle which is below the sealing ring 8 is provided with holes 9 to facilitate the removal of dust and fumes from above, while its lower end is also open and kept in correct position by a bearing ring 10 supported from the lower side of the top of suction box 2.

The turnable 4 carries on it lower side a large annulus 11 whose bottom periphery is V-shaped or otherwise formed to be engaged by a rotary driving member 12 mounted near the free end of a shaft 13 driven by variable speed reduction gearing 14, the end of the shaft being supported in a bearing 15.

An upright guide post 16 is mounted on the base plate 1 and has a vertical screw 17 positioned along the front side of it to be rotated in any suitable manner, the screw being in threaded engagement with a radial guide member 18 which carries a radially adjustable arm 19 on the free end of which a flame spraying head 20 carrying an adjustable nozzle 21 is mounted. Since the arm 19 is also approximately radial to the turntable, it will be possible with the help of the turntable itself to direct the nozzle to any portion of a workpiece which is positioned endwise on the turntable.

The means for raising and lowering the flame spraying head 20 is particularly shown in FIG. 3. The motor 24 through the gearing contained in housing 25 and the clutch 26 actuates the vertical screw 17 until lug 29 contacts collar 28. The vertical movement of collar 28 mounted on rod 27 disengages the clutch 26 so that rotation of the handwheel 22 and bevel gear 23 controls the vertical movement of the flame spraying head for hand adjustment and positioning.

DESCRIPTION OF THE PREFERRED EMBODIMENTS

The apparatus shown in the drawings is useful for any kind of treatment such as flame spraying of metallic or non-metallic coatings, sand blasting or grinding where such treatment produces duct or fumes.

The apparatus, although capable of many different uses, is primarily useful for flame coating of elongated objects positioned endwise on the turntable at or near its central axis. During rotation of the turntable or alternately therewith, the nozzle or other device by which the work is treated is moved or adjusted vertically along a supporting post by any suitable kind of a device such as a rotatable screw, is also adjustable toward or from the post along a horizontal arm extending across the periphery of the turntable and is adjustable angularly in any desired direction at the free end of the arm.

In a particular embodiment used for spraying the inside diameters of cylindrical objects, the spraying head has a nozzle with an extension and angular spray cap for reaching all parts of the inside walls of the cylinders.

As an illustration of the use of the apparatus of the present invention, a metal pipe is mounted vertically on the turntable with one end over the hole in spindle 3. The spraying head 20 is adjusted over the other end of the pipe and nozzle 21 is extended to a position near the bottom of the pipe. The turntable is rotated at a constant rate of several revolutions per minute by switching on the motor which drives reduction gearing 14, shaft 13 and driving member 12. From a remote position of observation the flame spraying from nozzle 21 is commenced and the rate of vertical movement of spraying head 20 is synchronized by activation of motor 24.

After the end of nozzle 21 leaves the inside of the pipe, the spraying is discontinued and, if it is desired, the outside diameter of the pipe is ready for the application of a coating. Again the nozzle 21 is positioned at the bottom of the pipe but on the outside thereof. The same procedure is then followed for spraying the outside diameter of the pipe.

During the spraying of the inside diameter of the pipe, the excess spraying material and fumes pass into the hole of spindle 3. The use of suction blower 6 is optional and depends on the volume of dust and fumes produced in the spraying operation. The use of the suction blower 6 is, however preferred.

It will be understood that this invention is susceptible to modification in order to adapt it to different usages and conditions and, accordingly, it is desired to comprehend such modifications within this invention as may fall within thes cope of the appended clams.

What is claimed is:

1. A turntable apparatus for removing airborne by-products that are produced during flame-spray treatment of the interior of a workpiece that is positioned on the turntable, said mechanism comprising:
   (a) a centrally apertured turntable with a downwardly extending hollow spindle;
   (b) means for rotatably supporting said turntable having a workpiece thereon, the means consisting of an antifriction bearing for supporting the weight of the turntable, spindle and workpieces, and a bearing ring engaging the lower end of the sprindle to give it lateral support,
   (c) means for rotating said turntable,
   (d) means for adjustably and movably supporting a flame-sprayer above said turntable, the flame-sprayer being carried on the free end of a horizontally adjustable and vertically movable arm which is itself supported by means for vertical movement along an upright post at one side of the turntable, and
   (e) a suction box mounted on the anti-friction bearing and a suction pump connected thereto for removing the airborne by-products, the suction box carrying a sealing ring that engages the outside wall of the hollow spindle.

2. The apparatus of claim 1, wherein the bearing ring is supported from underneath the top of the suction box.

3. The apparatus of claim 1, wherein said means for vertical movement is a lead screw.

4. The apparatus of claim 1, wherein said flame sprayer has an extendable nozzle and angular spray cap thereon.

5. The apparatus of claim 1, wherein said means for adjustably and movably supporting is a horizontally adjustable and vertically movable arm carrying said flame sprayer at the end thereof, and said arm is supported for vertical movement along an upright post at one side of the turntable by a lead screw.

References Cited

UNITED STATES PATENTS

| | | | |
|---|---|---|---|
| 1,201,448 | 10/1916 | Edison | 118—321 |
| 1,281,407 | 10/1918 | Marquess. | |
| 2,953,483 | 9/1960 | Torok. | |
| 2,998,922 | 9/1961 | Gibson. | |
| 3,333,571 | 8/1967 | Kokinda | 118—318 |

WALTER A. SCHEEL, Primary Examiner

J. P McIntosh, Assistant Examiner

U.S. Cl. X.R.

118—321, 326